(12) United States Patent
Ben Yizhak et al.

(10) Patent No.: US 11,665,066 B2
(45) Date of Patent: May 30, 2023

(54) SYSTEMS AND METHODS FOR MANAGING COLLABORATION BETWEEN NETWORK DEVICES OVER A COMMUNICATIONS NEWORK

(71) Applicant: ELBIT SYSTEMS C4I AND CYBER LTD., Netanya (IL)

(72) Inventors: Eli Ben Yizhak, Netanya (IL); Yossef Golan, Netanya (IL); Haim Teichholtz, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/047,282

(22) Filed: Oct. 18, 2022

(65) Prior Publication Data

US 2023/0113372 A1  Apr. 13, 2023

Related U.S. Application Data

(63) Continuation of application No. PCT/IL2021/050166, filed on Feb. 11, 2021.

(30) Foreign Application Priority Data

Apr. 30, 2020 (IL) .......................................... 274385
Jul. 6, 2020 (IL) .......................................... 275895

(51) Int. Cl.
*H04L 41/5009* (2022.01)
*H04L 41/5019* (2022.01)
*H04L 41/0896* (2022.01)

(52) U.S. Cl.
CPC ...... *H04L 41/5009* (2013.01); *H04L 41/0896* (2013.01); *H04L 41/5019* (2013.01)

(58) Field of Classification Search
CPC ............. H04L 41/5009; H04L 41/0896; H04L 41/5019
See application file for complete search history.

(56) References Cited

U.S. PATENT DOCUMENTS 6,459,695 B1  10/2002  Schmitt
7,136,636 B1  11/2006  McLaughlin
(Continued)

FOREIGN PATENT DOCUMENTS

EP  1523154 A1  4/2005
EP  2760234 A1  1/2014
(Continued)

*Primary Examiner* — Joe Chacko (57) ABSTRACT

A system for management of task force collaboration over a communications network comprising a plurality of network devices, the system comprising processing circuitry configured to: provide: (a) a dynamic Quality of Service availability map, the dynamic Quality of Service availability map being indicative of current available Quality of Services at a plurality of geographical locations within the communications network; (b) groups' information indicative of one or more task force collaboration groups, wherein each task force collaboration group of the task force collaboration groups indicates at least two of the network devices being members in the respective task force collaboration group; and (c) current locations' information indicative of current geographical locations of at least some of the network devices; obtain, from a given member of a given task force collaboration group of the task force collaboration groups, a message to be transmitted to other members of the given task force collaboration group, other than the given member, the message having a Quality of Service requirement; identify at least one message manipulation requiring member of the other members, that is currently located, according to the current locations' information, at a respective first geographical location having, according to the dynamic Quality (Continued)

of Service availability map, an available Quality of Service that does not support the Quality of Service requirement; generate, for the message manipulation requiring member, a manipulated message, being a manipulation of the message, wherein the manipulated message meets the available Quality of Service; and communicate the manipulated message to the message manipulation requiring member

17 Claims, 5 Drawing Sheets

(56) References Cited

U.S. PATENT DOCUMENTS

| | | |
|---|---|---|
| 2003/0112766 A1 | 6/2003 | Riedel et al. |
| 2009/0016504 A1 | 1/2009 | Mantell et al. |
| 2009/0300688 A1 | 12/2009 | Karaoguz et al. |
| 2010/0228854 A1 | 9/2010 | Morrison et al. |
| 2011/0055403 A1 | 3/2011 | Balachandran |
| 2011/0275369 A1 | 11/2011 | Bartlett et al. |
| 2011/0312312 A1 | 12/2011 | Astrom |
| 2014/0064084 A1 | 3/2014 | Paladugu et al. |
| 2014/0230000 A1 | 8/2014 | Kotecha et al. |
| 2016/0021545 A1 | 1/2016 | Shaw |
| 2016/0366623 A1 | 12/2016 | Senarath et al. |

FOREIGN PATENT DOCUMENTS

| | | |
|---|---|---|
| GB | 2387070 A | 10/2003 |
| GB | 2480079 A | 11/2011 |
| KR | 20040110864 A | 12/2004 |
| WO | 2010022470 A1 | 3/2010 |
| WO | 2010100315 A1 | 9/2010 |

SYSTEMS AND METHODS FOR MANAGING COLLABORATION BETWEEN NETWORK DEVICES OVER A COMMUNICATIONS NEWORK

TECHNICAL FIELD

The invention relates to systems and methods for managing collaboration between network devices over a communications network.

BACKGROUND

Network devices that are members in a collaboration group of a given messaging platform (e.g., WhatsApp) can collaborate over a communications network (e.g., a cellular network) to achieve one or more objectives. Specifically, a network device that is a member in a collaboration group can transmit a message instantaneously or over a given time period to other network devices that are members in the collaboration group.

A problem arises when a given network device that is a member in a collaboration group is incapable of receiving, or receiving at a sufficient quality, a message (e.g., voice message, video message, etc.) that is transmitted from another network device that is a member in the collaboration group (e.g., the given network device experiences poor or inadequate network reception at the time that the message is transmitted or the given network device lacks the capability to correctly present the message, for example: when the message is a video message and the given network device lacks a screen), thereby weakening collaboration over a communications network between the network devices that are members in the collaboration group.

There is thus a need in the art for new systems and methods for managing collaboration over a communications network between network devices that are members in a collaboration group.

GENERAL DESCRIPTION

In accordance with a first aspect of the presently disclosed subject matter, there is provided a system for management of task force collaboration over a communications network comprising a plurality of network devices, the system comprising processing circuitry configured to: provide: (a) a dynamic Quality of Service availability map, the dynamic Quality of Service availability map being indicative of current available Quality of Services at a plurality of geographical locations within the communications network; (b) groups' information indicative of one or more task force collaboration groups, wherein each task force collaboration group of the task force collaboration groups indicates at least two of the network devices being members in the respective task force collaboration group; and (c) current locations' information indicative of current geographical locations of at least some of the network devices; obtain, from a given member of a given task force collaboration group of the task force collaboration groups, a message to be transmitted to other members of the given task force collaboration group, other than the given member, the message having a Quality of Service requirement; identify at least one message manipulation requiring member of the other members, that is currently located, according to the current locations' information, at a respective first geographical location having, according to the dynamic Quality of Service availability map, an available Quality of Service that does not support the Quality of Service requirement; generate, for the message manipulation requiring member, a manipulated message, being a manipulation of the message, wherein the manipulated message meets the available Quality of Service; and communicate the manipulated message to the message manipulation requiring member.

In some cases, the manipulated message is one of the following transformations of the message: encoding, transcoding, down-sampling, video-to-voice, video-to-image, video-to-text, video-to-link, voice-to-text, voice-to-link, or text-to-link.

In some cases, the network devices include at least one user device.

In some cases, the network devices include at least one Internet of Things (IoT) device.

In some cases, the network devices include at least one user device and at least one IoT device.

In some cases, the processing circuitry is further configured to continuously perform the following: receive, from at least some of the network devices, current available Quality of Service information indicative of a current available Quality of Service of the respective network device; and update the dynamic Quality of Service availability map based on the current locations' information and the current available Quality of Service information.

In some cases, the processing circuitry is further configured to: receive, from an operator of the communications network, operator information indicative of the current available Quality of Services at one or more of the geographical locations; and update the dynamic Quality of Service availability map based on the operator information.

In some cases, a first member of the other members receives a first manipulated message, being the message manipulated in a first manner, and a second member of the other members receives a second manipulated message, being the message manipulated in a second manner, other than the first manner.

In accordance with a second aspect of the presently disclosed subject matter, there is provided a system for management of task force collaboration over a communications network comprising a plurality of network devices, the system comprising processing circuitry configured to: provide: (a) a predicted Quality of Service availability map, the predicted Quality of Service availability map being indicative of predicted available Quality of Services at a plurality of geographical locations at one or more future times; and (b) predicted locations' information indicative of predicted geographical locations of at least some of the network devices; predict a Quality of Service availability level for at least one given network device of the network devices, the predicted Quality of Service availability level being indicative of a predicted available Quality of Service at a given predicted location of the predicted geographical locations associated with the given network device, according to the predicted Quality of Service availability map and the predicted locations' information; and communicate an indication of the predicted Quality of Service availability level to at least one of the network devices.

In some cases, the processing circuitry is further configured to cause display of the indication of the predicted Quality of Service availability level to at least one user of the at least one of the network devices.

In some cases, the indication is displayed on a user interface of the given network device.

In some cases, the indication is displayed on a user interface of one or more second network devices of the network devices, other than the given network device.

In some cases, the second network devices are identified using groups' information indicative of one or more task force collaboration groups, wherein each task force collaboration group of the task force collaboration groups indicates at least two of the network devices being members in the respective task force collaboration group, so that the second network devices and the given network device are members of one or more common task force collaboration groups.

In some cases, the network devices include at least one user device.

In some cases, the network devices include at least one Internet of Things (IoT) device.

In some cases, the network devices include at least one user device and at least one IoT device.

In accordance with a third aspect of the presently disclosed subject matter, there is provided a method for management of task force collaboration over a communications network comprising a plurality of network devices, the method comprising: providing: (a) a dynamic Quality of Service availability map, the dynamic Quality of Service availability map being indicative of current available Quality of Services at a plurality of geographical locations within the communications network; (b) groups' information indicative of one or more task force collaboration groups, wherein each task force collaboration group of the task force collaboration groups indicates at least two of the network devices being members in the respective task force collaboration group; and (c) current locations' information indicative of current geographical locations of at least some of the network devices; obtaining, from a given member of a given task force collaboration group of the task force collaboration groups, a message to be transmitted to other members of the given task force collaboration group, other than the given member, the message having a Quality of Service requirement; identifying at least one message manipulation requiring member of the other members, that is currently located, according to the current locations' information, at a respective first geographical location having, according to the dynamic Quality of Service availability map, an available Quality of Service that does not support the Quality of Service requirement; generating, for the message manipulation requiring member, a manipulated message, being a manipulation of the message, wherein the manipulated message meets the available Quality of Service; and communicating the manipulated message to the message manipulation requiring member.

In some cases, the manipulated message is one of the following transformations of the message: encoding, transcoding, down-sampling, video-to-voice, video-to-image, video-to-text, video-to-link, voice-to-text, voice-to-link, or text-to-link.

In some cases, the network devices include at least one user device.

In some cases, the network devices include at least one Internet of Things (IoT) device.

In some cases, the network devices include at least one user device and at least one IoT device.

In some cases, the method further comprises continuously performing the following: receiving, from at least some of the network devices, current available Quality of Service information indicative of a current available Quality of Service of the respective network device; and updating the dynamic Quality of Service availability map based on the current locations' information and the current available Quality of Service information.

In some cases, the method further comprises: receiving, from an operator of the communications network, operator information indicative of the current available Quality of Services at one or more of the geographical locations; and updating the dynamic Quality of Service availability map based on the operator information.

In some cases, a first member of the other members receives a first manipulated message, being the message manipulated in a first manner, and a second member of the other members receives a second manipulated message, being the message manipulated in a second manner, other than the first manner.

In accordance with a fourth aspect of the presently disclosed subject matter, there is provided a method for management of task force collaboration over a communications network comprising a plurality of network devices, the method comprising: providing: (a) a predicted Quality of Service availability map, the predicted Quality of Service availability map being indicative of predicted available Quality of Services at a plurality of geographical locations at one or more future times; and (b) predicted locations' information indicative of predicted geographical locations of at least some of the network devices; predicting a Quality of Service availability level for at least one given network device of the network devices, the predicted Quality of Service availability level being indicative of a predicted available Quality of Service at a given predicted location of the predicted geographical locations associated with the given network device, according to the predicted Quality of Service availability map and the predicted locations' information; and communicating an indication of the predicted Quality of Service availability level to at least one of the network devices.

In some cases, the method further comprises: causing display of the indication of the predicted Quality of Service availability level to at least one user of the at least one of the network devices.

In some cases, wherein the indication is displayed on a user interface of the given network device.

In some cases, the indication is displayed on a user interface of one or more second network devices of the network devices, other than the given network device.

In some cases, the second network devices are identified using groups' information indicative of one or more task force collaboration groups, wherein each task force collaboration group of the task force collaboration groups indicates at least two of the network devices being members in the respective task force collaboration group, so that the second network devices and the given network device are members of one or more common task force collaboration groups.

In some cases, the network devices include at least one user device.

In some cases, the network devices include at least one Internet of Things (IoT) device.

In some cases, the network devices include at least one user device and at least one IoT device.

In accordance with a fifth aspect of the presently disclosed subject matter, there is provided a non-transitory computer readable storage medium having computer readable program code embodied therewith, the computer readable program code, executable by processing circuitry of a computer to perform a method for management of task force collaboration over a communications network comprising a plurality of network devices, the method comprising: providing: (a) a dynamic Quality of Service availability map, the dynamic Quality of Service availability map being indicative of current available Quality of Services at a plurality of geographical locations within the communications network; (b) groups' information indicative of one or more task force collaboration groups, wherein each task force collaboration group of the task force collaboration groups indicates at least two of the network devices being members in the respective task force collaboration group; and (c) current locations' information indicative of current geographical locations of at least some of the network devices; obtaining, from a given member of a given task force collaboration group of the task force collaboration groups, a message to be transmitted to other members of the given task force collaboration group, other than the given member, the message having a Quality of Service requirement; identifying at least one message manipulation requiring member of the other members, that is currently located, according to the current locations' information, at a respective first geographical location having, according to the dynamic Quality of Service availability map, an available Quality of Service that does not support the Quality of Service requirement; generating, for the message manipulation requiring member, a manipulated message, being a manipulation of the message, wherein the manipulated message meets the available Quality of Service; and communicating the manipulated message to the message manipulation requiring member.

In accordance with a sixth aspect of the presently disclosed subject matter, there is provided a non-transitory computer readable storage medium having computer readable program code embodied therewith, the computer readable program code, executable by processing circuitry of a computer to perform a method for management of task force collaboration over a communications network comprising a plurality of network devices, the method comprising: providing: (a) a predicted Quality of Service availability map, the predicted Quality of Service availability map being indicative of predicted available Quality of Services at a plurality of geographical locations at one or more future times; and (b) predicted locations' information indicative of predicted geographical locations of at least some of the network devices; predicting a Quality of Service availability level for at least one given network device of the network devices, the predicted Quality of Service availability level being indicative of a predicted available Quality of Service at a given predicted location of the predicted geographical locations associated with the given network device, according to the predicted Quality of Service availability map and the predicted locations' information; and communicating an indication of the predicted Quality of Service availability level to at least one of the network devices.

In accordance with a seventh aspect of the presently disclosed subject matter, there is provided a system for management of task force collaboration over a communications network comprising a plurality of network devices, the system comprising processing circuitry configured to provide: (a) network devices capabilities information, the network devices capabilities information being indicative of capabilities of each of the network devices; and (b) groups' information indicative of one or more task force collaboration groups, wherein each task force collaboration group of the task force collaboration groups indicates at least two of the network devices being members in the respective task force collaboration group; obtain, from a given member of a given task force collaboration group of the task force collaboration groups, a message to be transmitted to other members of the given task force collaboration group, other than the given member, the message having a capabilities requirement; identify at least one message manipulation requiring member of the other members, that is associated with a given network device having, according to the network devices capabilities information, respective capabilities that do not support the capabilities requirement; generate, for the message manipulation requiring member, a manipulated message, being a manipulation of the message, wherein the manipulated message meets the respective capabilities of the given network device; and communicate the manipulated message to the message manipulation requiring member.

In some cases, the processing circuitry is further configured to provide also: (i) a dynamic Quality of Service availability map, the dynamic Quality of Service availability map being indicative of current available Quality of Services at a plurality of geographical locations within the communications network; and (ii) current locations' information indicative of current geographical locations of at least some of the network devices; the message having a Quality of Service requirement; the at least one message manipulation requiring member is currently located, according to the current locations' information, at a respective first geographical location having, according to the dynamic Quality of Service availability map, an available Quality of Service that does not support the Quality of Service requirement; and the manipulated message also meets the available Quality of Service.

In some cases, the manipulated message is one of the following transformations of the message: encoding, transcoding, down-sampling, video-to-voice, video-to-image, video-to-text, video-to-link, voice-to-text, voice-to-link, or text-to-link.

In some cases, the network devices include at least one user device.

In some cases, the network devices include at least one Internet of Things (IoT) device.

In some cases, the network devices include at least one user device and at least one IoT device.

In some cases, the processing circuitry is further configured to continuously perform the following: receive, from at least some of the network devices, current network devices capabilities information indicative of current capabilities of the respective network device; and update the network devices capabilities information based on the current capabilities.

In some cases, a first member of the other members receives a first manipulated message, being the message manipulated in a first manner, and a second member of the other members receives a second manipulated message, being the message manipulated in a second manner, other than the first manner.

In accordance with an eight aspect of the presently disclosed subject matter, there is provided a method for management of task force collaboration over a communications network comprising a plurality of network devices, the method comprising: providing, by a processing circuitry: (a) network devices capabilities information, the network devices capabilities information being indicative of capabilities of each of the network devices; and (b) groups' information indicative of one or more task force collaboration groups, wherein each task force collaboration group of the task force collaboration groups indicates at least two of the network devices being members in the respective task force collaboration group; obtaining, by the processing circuitry, from a given member of a given task force collaboration group of the task force collaboration groups, a message to be transmitted to other members of the given task force collaboration group, other than the given member, the message having a capabilities requirement; identifying, by the processing circuitry, at least one message manipulation requiring member of the other members, that is associated with a given network device having, according to the network devices capabilities information, respective capabilities that do not support the capabilities requirement; generating, by the processing circuitry, for the message manipulation requiring member, a manipulated message, being a manipulation of the message, wherein the manipulated message meets the respective capabilities of the given network device; and communicating, by the processing circuitry, the manipulated message to the message manipulation requiring member.

In some cases, the method further comprising: providing also, by the processing circuitry: (i) a dynamic Quality of Service availability map, the dynamic Quality of Service availability map being indicative of current available Quality of Services at a plurality of geographical locations within the communications network; and (ii) current locations' information indicative of current geographical locations of at least some of the network devices; the message having a Quality of Service requirement; the at least one message manipulation requiring member is currently located, according to the current locations' information, at a respective first geographical location having, according to the dynamic Quality of Service availability map, an available Quality of Service that does not support the Quality of Service requirement; and the manipulated message also meets the available Quality of Service.

In some cases, the manipulated message is one of the following transformations of the message: encoding, transcoding, down-sampling, video-to-voice, video-to-image, video-to-text, video-to-link, voice-to-text, voice-to-link, or text-to-link.

In some cases, the network devices include at least one user device.

In some cases, the network devices include at least one Internet of Things (IoT) device.

In some cases, the network devices include at least one user device and at least one IoT device.

In some cases, the method further comprising: receiving, by the processing circuitry, from at least some of the network devices, current network devices capabilities information indicative of current capabilities of the respective network device; and updating, by the processing circuitry, the network devices capabilities information based on the current capabilities.

In some cases, a first member of the other members receives a first manipulated message, being the message manipulated in a first manner, and a second member of the other members receives a second manipulated message, being the message manipulated in a second manner, other than the first manner.

In accordance with an eight aspect of the presently disclosed subject matter, there is provided a non-transitory computer readable storage medium having computer readable program code embodied therewith, the computer readable program code, executable by at least one processing circuitry of a computer to perform a method for management of task force collaboration over a communications network comprising a plurality of network devices, the method comprising: providing, by a processing circuitry: (a) network devices capabilities information, the network devices capabilities information being indicative of capabilities of each of the network devices; and (b) groups' information indicative of one or more task force collaboration groups, wherein each task force collaboration group of the task force collaboration groups indicates at least two of the network devices being members in the respective task force collaboration group; obtaining, by the processing circuitry, from a given member of a given task force collaboration group of the task force collaboration groups, a message to be transmitted to other members of the given task force collaboration group, other than the given member, the message having a capabilities requirement; identifying, by the processing circuitry, at least one message manipulation requiring member of the other members, that is associated with a given network device having, according to the network devices capabilities information, respective capabilities that do not support the capabilities requirement; generating, by the processing circuitry, for the message manipulation requiring member, a manipulated message, being a manipulation of the message, wherein the manipulated message meets the respective capabilities of the given network device; and communicating, by the processing circuitry, the manipulated message to the message manipulation requiring member.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "identifying", "generating", "communicating", "receiving", "updating", "determining", "displaying" or the like, include actions and/or processes, including, inter alia, actions and/or processes of a computer, that manipulate and/or transform data into other data, said data represented as physical quantities, e.g. such as electronic quantities, and/or said data representing the physical objects.

The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
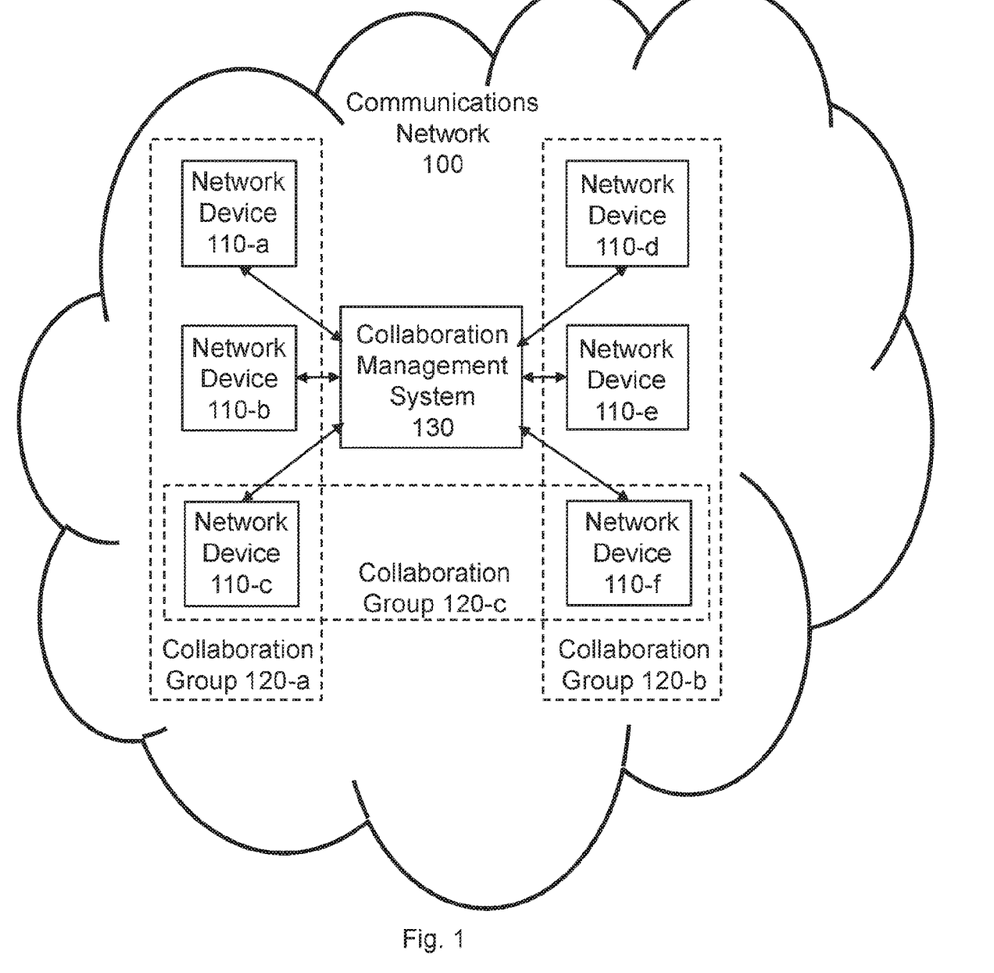
FIG. 1 is a schematic illustration of a communications network, in accordance with the presently disclosed subject matter.
Figure 2:
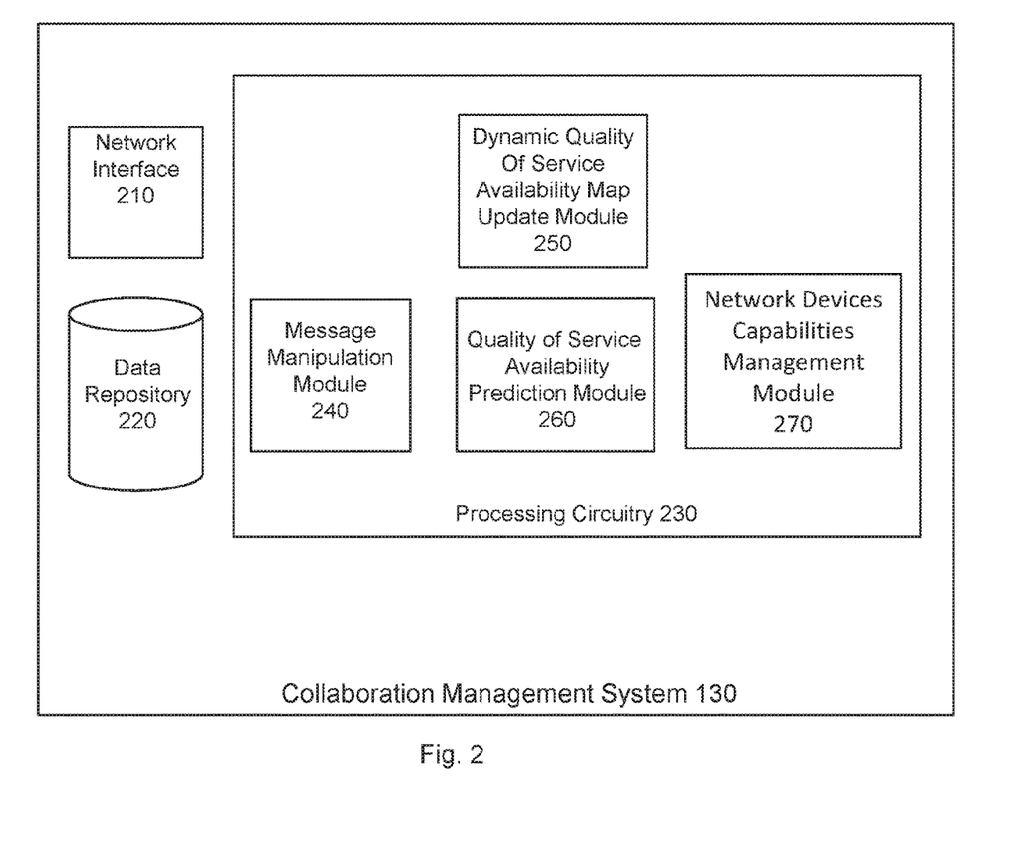
FIG. 2 is a block diagram schematically illustrating one example of a collaboration management system, in accordance with the presently disclosed subject matter.
Figure 3:
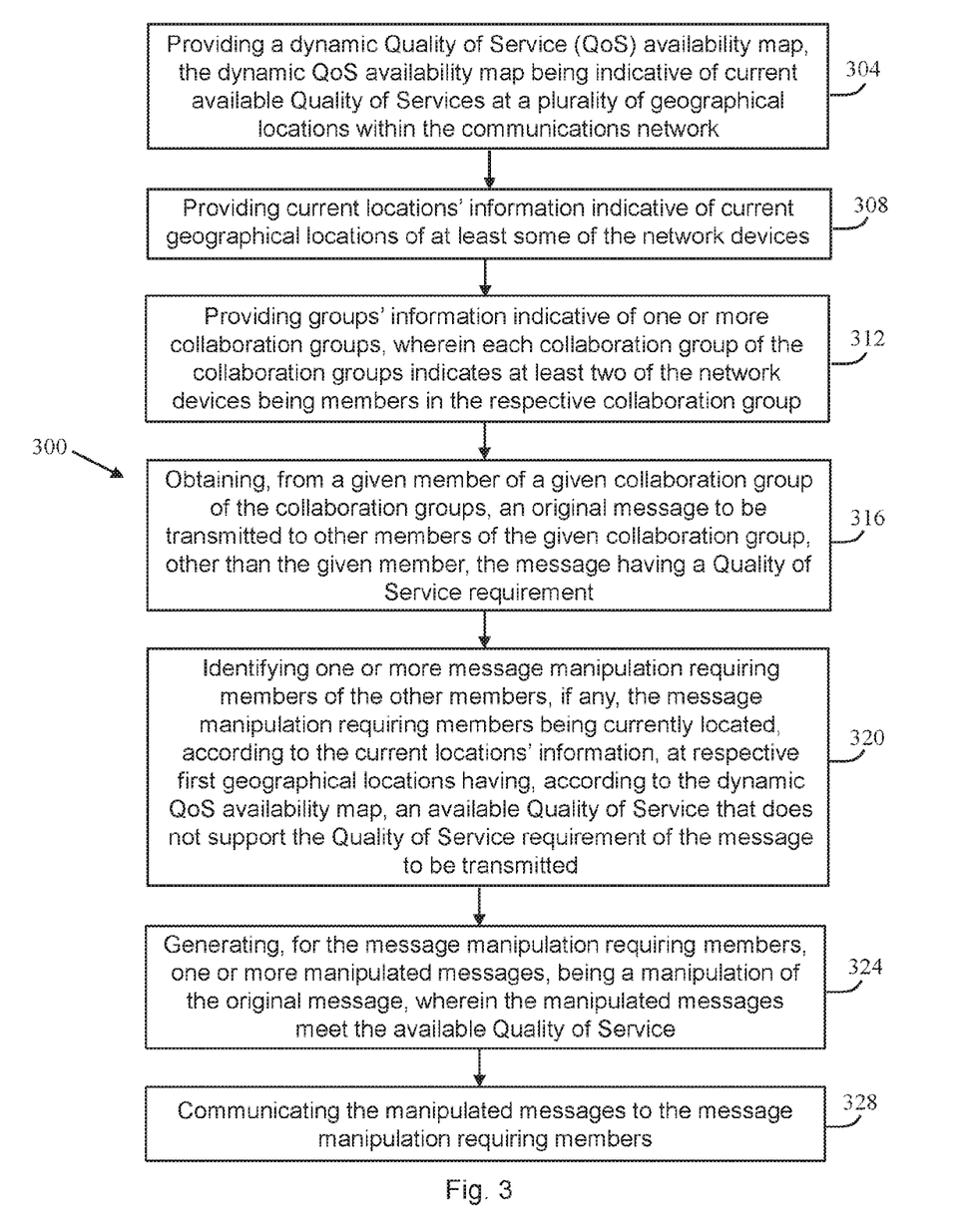
FIG. 3 is a flowchart illustrating a first example of a sequence of operations performed by a collaboration management system, in accordance with the presently disclosed subject matter.
Figure 4:
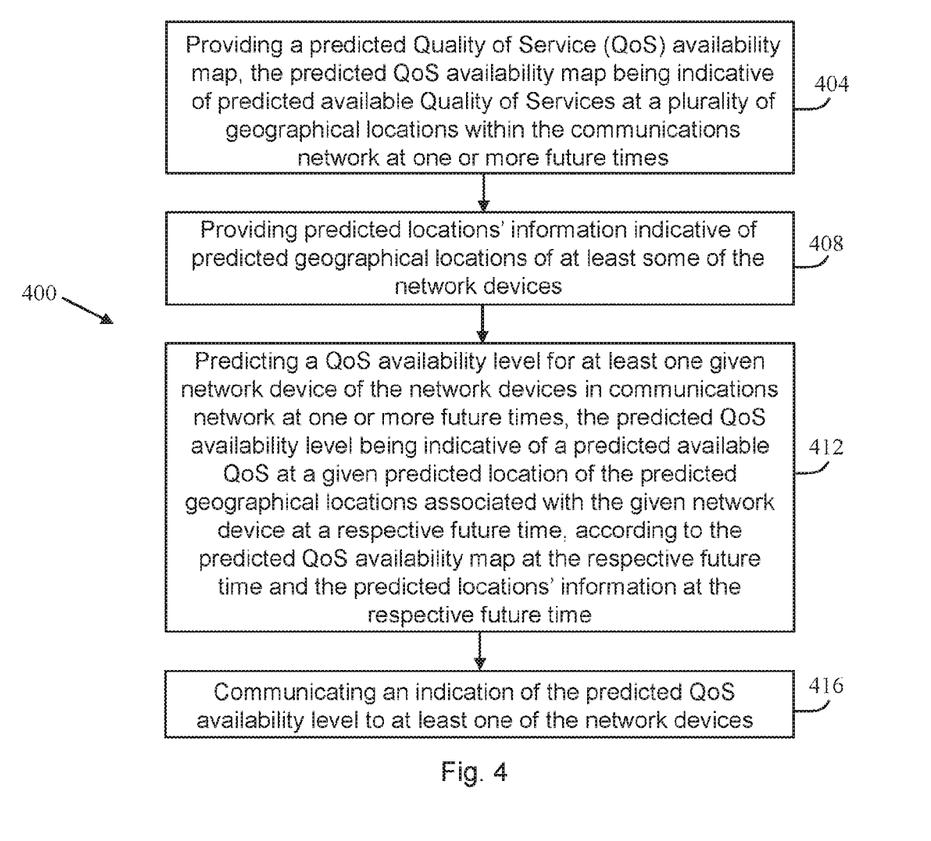
FIG. 4 is a flowchart illustrating a second example of a sequence of operations performed by a collaboration management system, in accordance with the presently disclosed subject matter.
Figure 5:
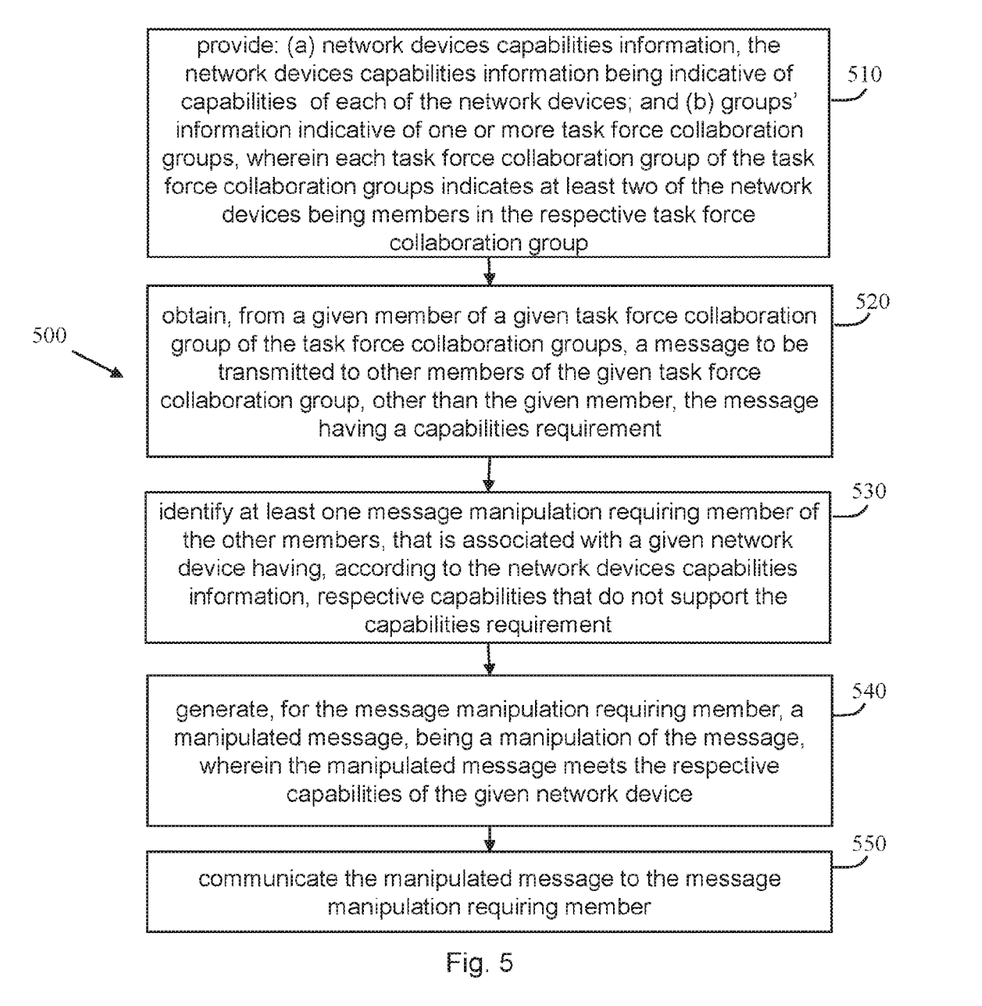
FIG. 5 is a flowchart illustrating an example of a sequence of operations performed by a collaboration management system for network devices capabilities management, in accordance with the presently disclosed subject matter.

In embodiments of the presently disclosed subject matter, fewer, more and/or different stages than those shown in FIGS. 3-5 may be executed. In embodiments of the presently disclosed subject matter one or more stages illustrated in FIGS. 3-5 may be executed in a different order and/or one or more groups of stages may be executed simultaneously. FIGS. 1 and 2 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of a communications network 100, in accordance with the presently disclosed subject matter.

In accordance with the presently disclosed subject matter, communications network 100 (e.g., a cellular network) can be configured to include a plurality of network devices. In some cases, the network devices can include at least one user device. In some cases, the network devices can include at least one Internet of Things (IoT) device. In some cases, the network devices can include at least one user device and at least one IoT device. For illustrative purposes only, FIG. 1 illustrates six network devices (network devices 110.-*a*, 110-*b*, 110-*c*, 110-*d*, 110-*e*, and 110-*f*) that operate in the communications network 100.

At least some of the network devices (e.g., network devices 110-*a*, 110-*b*, 110-*c*, 110-*d*, 110-*e*, 110-*f*) that operate in the communications network 100 can be members in one or more collaboration groups (e.g., collaboration groups 120-*a*, 120-*b*, 120-*c*) of at least one messaging platform, wherein a network device (e.g., 110-*a*) that is a member in a respective collaboration group (e.g., 120-*a*) can transmit a message instantaneously or over a given time period to other network devices (e.g., 110-*b*, 110-*c*) that are members in the respective collaboration group (e.g., 120-*a*), and wherein a respective collaboration group (e.g., 120-*a*) can be a task force collaboration group (e.g., 120-*a*), thereby enabling collaboration between members of a task force. It is to be noted that for the purposes of this disclosure, a message is a logical entity, which can be comprised of a group of one or more network packets that are transmitted, by one of the network devices to one or more other network devices, over communications network 100. A message can be a text message, a file, streaming media (e.g., voice or video), voice recording, or any other type of content that can be sent, by one of the network devices to one or more other network devices, over communications network 100.

Each collaboration group (e.g., 120-*a*) of the collaboration groups (120-*a*, 120-*b*, and 120-*c*) indicates at least two of the network devices (e.g., network devices 110-*a*, 110-*b*, and 110-*c*) being members in the respective collaboration group (e.g., 120-*a*). For illustrative purposes only, FIG. 1 illustrates three collaboration groups (collaboration groups 120-*a*, 120-*b*, 120-*c*). Network devices 110-*a*, 110-*b* and 110-*c* are members in collaboration group 120-*a*. Network devices 110-*d*, 110-*e* and 110-*f* are members in collaboration group 120-*b*. Network devices 110-*c* and 110-*f* are members in collaboration group 120-*c*.

Communications network 100 can be configured to include a collaboration management system 130, which can be a task force management collaboration system for enabling collaboration between members of a task force. In some cases, collaboration management system 130 can be installed on a dedicated server, which optionally can be distributed. Additionally, or alternatively, in some cases, collaboration management system 130 can be installed on one of the network devices (e.g., 110-*a*, 110-*b*, 110-*c*, 110-*d*, 110-*e*, 110-*f*) that operate in communications network 100 or can be distributed between a plurality of the network devices (e.g., 110-*a*, 110-*b*, 110-*c*, 110-*d*, 110-*e*, 110-*f*) that operate in communications network 100.

In accordance with the presently disclosed subject matter, each network device that operates in communications network 100 can have network device capabilities information at any given time. The network device capabilities information at a current time is determined utilizing at least one of the following parameters of the network device at the current time: (a) hardware components that are part or otherwise connected to the network device (e.g. a screen, a camera, a Global Positioning System (GPS), a speaker, a keyboard, etc.), (b) software components that are installed on the network device (e.g. media player, video and audio codecs, software licenses, etc.) or (c) the locale of the network device (e.g. a set of parameters that define a user's of the network device language, region or any special variant preferences that the user of the network device wants to see in their user interface).

Similarly, each message can have a capabilities requirement, defining at least one of: (a) a minimal required set of hardware components of a network device receiving the message, (b) a minimal required set of software components of a network device receiving the message or (c) locale requirements.

In some cases, a network device capabilities information of a first member (e.g., network device 110-c) in a collaboration group (e.g., collaboration group 120-a) does not support a capabilities requirement of a given message (e.g., voice message, video message, etc.) that is transmitted by a second member (e.g., network device 110-a) in the collaboration group (e.g., collaboration group 120-a), e.g. due to lack of hardware or software components of the first member (e.g., network device 110-c lacks a screen). Some examples include: (a) a given message is a textual message that requires a screen to be displayed, whereas the network device receiving the message lacks a screen, (b) a given message is a video message that requires a certain codec to be played, whereas the network device receiving the message lacks that certain codec, (c) a given message may require a speaker in order to be played, whereas the network device receiving the message lacks a speaker, (d) a given message may require a given software license in order to be correctly displayed on the network device, whereas the network device receiving the message does not have the given software license installed, or (e) a given message may be adapted to a given locale, whereas the network device receiving the message is excepting to receive messages in another locale. Although each of the examples refers to a single parameter, it is to be noted that in some cases the capabilities requirement of a given message can be any calculation based on more than one of the exemplified parameters.

In some cases, when the given message's capabilities requirements are not met by the first member's network device capabilities, collaboration management system 130 can be configured to enable the first member (e.g., 110-c) to receive or to timely receive the given message by generating a manipulated message to be communicated to the first member (e.g., 110-c), for example: a given textual message that is about to be sent to a network device lacking a screen can be manipulated into a voice message by utilizing a text-to-voice manipulation on the given textual message, as detailed further herein, inter alia with reference to FIGS. 2 and 5, the manipulated message being a manipulation of the given message and meeting the first member's capabilities.

In accordance with the presently disclosed subject matter, each network device that operates in communications network 100 can have a Quality of Service (QoS) availability level at any given time. The QoS availability level at a current time is determined utilizing at least one of the following parameters of the network device: (a) an available bandwidth made available to the network device by the communications network 100 at a bandwidth measurement time (e.g. at the current time, or at a certain point-in-time within a given time window prior to the current time), (b) a latency experienced by the network device over the communications network 100 at a latency measurement time (e.g. at the current time, or at a certain point-in-time within a given time window prior to the current time), (c) a Signal-to-Noise ratio (SNR) of data transmitted to the network device over the communications network 100 at a SNR measurement time (e.g. at the current time, or at a certain point-in-time within a given time window prior to the current time), or (d) a reception level available to the network device over the communications network 100 at a reception level measurement time (e.g. at the current time, or at a certain point-in-time within a given time window prior to the current time).

Similarly, each message can have a QoS requirement, defining at least one of: (a) a minimal required bandwidth to transmit the message, (b) a maximal allowed latency for transmitting the message, (c) a maximal SNR allowed during transmittal of the message, or (d) a minimal reception level required for transmitting the message.

In some cases, a Quality of Service (QoS) availability level of a first member (e.g., network device 110-c) in a collaboration group (e.g., 120-a) does not support a QoS requirement of a given message (e.g., voice message, video message, etc.) that is transmitted by a second member (e.g., network device 110-a) in the collaboration group (e.g., 120-a), e.g. due to an available QoS at the geographical location at which the first member (e.g., network device 110-c) is located that does not support the QoS requirement of the given message. Some examples include: (a) a given message may require a bandwidth of 5 Mega Bytes (MB) for transmittal thereof from the second member to the first member, whereas the current available bandwidth of the first member is only 3 MB, (b) a given message may allow a latency of 3 milliseconds during transmittal thereof from the second member to the first member, whereas the current latency of the first member is 10 milliseconds, (c) a given message may require a SNR greater than 25 dB for transmittal thereof from the second member to the first member, whereas the current SNR of the first member is only 20 dB, or (d) a given message may require a reception level greater than -90 dBm for transmittal thereof from the second member to the first member, whereas the current reception level of the first member is -100 dBm. Although each of the examples refers to a single parameter, it is to be noted that in some cases the QoS availability level and the QoS requirement of a given message can be any calculation based on more than one of the exemplified parameters.

In some cases, when the given message's QoS requirements are not met by the first member's QoS availability level, collaboration management system 130 can be configured to enable the first member (e.g., 110-c) to receive or to timely receive the given message by generating a manipulated message to be communicated to the first member (e.g., 110-c), as detailed further herein, inter alia with reference to FIGS. 2 and 3, the manipulated message being a manipulation of the given message and meeting the first member's QoS availability level.

In some cases, collaboration management system 130 can be configured to predict a Quality of Service (QoS) availability level for at least one given network device (e.g., 110-a, 110-b, 110-c, 110-d, 110-e, 110-f) in communications network 100, and to communicate an indication of the predicted QoS availability level to at least one of the network devices (e.g., 110-a, 110-b, 110-c, 110-d, 110-e, 110-f) in communications network 100, as detailed further herein, inter alia with reference to FIGS. 2 and 4.

In some cases, the collaboration management system 130 can be configured to manipulate messages in accordance with a combination of capabilities requirements and QoS requirements.

Attention is now drawn to FIG. 2, a block diagram schematically illustrating one example of a collaboration management system 130, in accordance with the presently disclosed subject matter.

In accordance with the presently disclosed subject matter, collaboration management system 130 can comprise at least one network interface 210 for enabling collaboration management system 130 to transmit data to and receive data from one or more of the computing devices (e.g., the network devices illustrated in FIG. 1) that are connected to the communications network 100.

Collaboration management system 130 can further comprise or be otherwise associated with a data repository 220 (e.g. a database, a storage system, a memory including Read Only Memory-ROM, Random Access Memory-RAM, or any other type of memory, etc.), being configured to store data, including, inter alia, one or more of the following data, being defined further herein, inter alia, with reference to FIGS. 3-5: network devices capabilities information, a dynamic QoS availability map, groups' information, current locations' information, a predicted QoS availability map, or predicted locations' information, etc. Data repository 220 can be configured to enable retrieval and/or updating and/or deletion of the stored data. It is to be noted that, in some cases, data repository 220 can be distributed (e.g., data repository 220 can be part of a cloud memory infrastructure accessible via an Internet connection).

Collaboration management system 130 further comprises processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant collaboration management system 130 resources and for enabling operations related to collaboration management system 130 resources.

In some cases, processing circuitry 230 can be configured to include a message manipulation module 240, being configured to generate and communicate manipulated messages, as detailed further herein, inter alia with reference to FIG. 3.

Additionally, in some cases, processing circuitry 230 can be configured to include a dynamic QoS availability map update module 250, being configured to update a dynamic QoS availability map, as detailed further herein, inter alia with reference to FIG. 3. The QoS availability map is indicative of current available Quality of Services at a plurality of geographical locations within communications network 100. The current available QoS at a respective geographical location within communications network 100 is determined utilizing at least one of the following parameters: (a) an available bandwidth made available by the communications network 100 to one or more respective network devices, of the network devices, that are located at the respective geographical location at a bandwidth measurement time (e.g. at a current time, or at a certain point-in-time within a given time window prior to the current time), (b) a latency experienced over the communications network 100 by one or more respective network devices, of the network devices, that are located at the respective geographical location at a latency measurement time (e.g. at a current time, or at a certain point-in-time within a given time window prior to the current time), (c) a Signal-to-Noise ratio (SNR) of data that is transmitted over the communications network 100 to one or more respective network devices, of the network devices, that are located at the respective geographical location at a SNR measurement time (e.g. at a current time, or at a certain point-in-time within a given time window prior to the current time), or (d) a reception level of one or more respective network devices, of the network devices in the communications network 100, that are located at the respective geographical location at a reception level measurement time (e.g. at a current time, or at a certain point-in-time within a given time window prior to the current time).

In some cases, processing circuitry 230 can be configured to include a QoS availability prediction module 260, being configured to predict a QoS availability level of at least one given network device (e.g., 110-*a*, 110-*b*, 110-*c*, 110-*d*, 110-*e*, 110-*f*) in communications network 100, as detailed further herein, inter alia with reference to FIG. 4. In some cases, processing circuitry 230 can be configured to include the message manipulation module 240, optionally the dynamic QoS availability map update module 250, and the QoS availability prediction module 260.

In some cases, processing circuitry 230 can be configured to include a network devices capabilities management module 270, being configured to manage network devices capabilities of at least one given network device (e.g., 110-*a*, 110-*b*, 110-*c*, 110-*d*, 110-*e*, 110-*f*) in communications network 100, as detailed further herein, inter alia with reference to FIG. 5.

Attention is now drawn to FIG. 3, a flowchart illustrating a first example of a sequence of operations 300 performed by collaboration management system 130, in accordance with the presently disclosed subject matter.

In accordance with the presently disclosed subject matter, collaboration management system 130 can be configured, in some cases, to provide a dynamic QoS availability map, the dynamic QoS availability map being indicative of current available Quality of Services at a plurality of geographical locations within communications network 100 (block 304).

Moreover, in some cases, collaboration management system 130 can be configured to provide current locations' information indicative of current geographical locations of at least some of the network devices (e.g., 110-*a*, 110-*b*, 110-*c*, 110-*d*, 110-*e*, 110-*f* (block 308). In some cases, the current locations' information for at least one of the network devices (e.g., 110-*a*, 110-*b*, 110-*c*, 110-*d*, 110-*e*, 110-*f*) can be a logical location of the at least one of the network devices (e.g., inside a given truck) that translates into a given geographical location of the at least one of the network devices.

In some cases, collaboration management system 130 can be configured to update the dynamic QoS availability map, e.g. using dynamic QoS availability map update module 250.

In some cases, collaboration management system 130 can be configured to update the dynamic QoS availability map by continuously performing the following: receiving, from at least some of the network devices (e.g., 110-*a*, 110-*b*, 110-*c*, 110-*d*, 110-*e*, 110-*f*), current available Quality of Service information indicative of a current available Quality of Service of the respective network device (e.g., 110-*a*, 110-*b*, 110-*c*, 110-*d*, 110-*e*, or 110-*f*); and updating the dynamic QoS availability map based on the current locations' information of the respective network device (e.g., 110-*a*, 110-*b*, 110-*c*, 110-*d*, 110-*e*, or 110-*f*) and the current available Quality of Service information indicative of the current available Quality of Service of the respective network device (e.g., 110-*a*, 110-*b*, 110-*c*, 110-*d*, 110-*e*, or 110-*f*).

Additionally, or alternatively, in some cases, collaboration management system 130 can be configured to update the dynamic QoS availability map by: receiving, from an operator of the communications network 100, operator information indicative of the current available Quality of Services at one or more geographical locations within communications network 100; and updating the dynamic QoS availability map based on the operator information.

Collaboration management system 130 can also be configured, in some cases, to provide groups' information indicative of the collaboration groups (e.g., 120-*a*, 120-*b*, 120-*c*), wherein each collaboration group of the collaboration groups (e.g., 120-*a*, 120-*b*, 120-*c*) indicates at least two of the network devices being members in the respective collaboration group (e.g., the members in collaboration group 120-*a* are network devices 110-*a*, 110-*b* and 110-*c*) (block 312).

In some cases, collaboration management system 130 can be configured to generate and communicate manipulated messages, e.g. using message manipulation module 240, based on the dynamic QoS availability map, the current locations' information, and the groups' information.

Specifically, collaboration management system 130 can be configured to obtain, from a given member (e.g., network device 110-*a*) of a given collaboration group (e.g., 120-*a*) of the collaboration groups (e.g., 120-*a*, 120-*b*, 120-*c*), an original message to he transmitted to other members (e.g., 110-*b*, 110-*c*) of the given collaboration group (e.g., 120-*a*), other than the given member (e.g., 110-*a*), the message having a Quality of Service requirement (block 316).

Collaboration management system 130 can be further configured to identify one or more message manipulation requiring members (e.g., 110-*b*) of the other members (e.g., 110*b* and 110*c*), if any, the message manipulation requiring members (e.g., 110-*b*) being currently located, according to the current locations' information, at respective first geographical locations having, according to the dynamic QoS availability map, an available Quality of Service that does not support the Quality of Service requirement of the message to be transmitted (block 320).

Moreover, collaboration management system 130 can be configured to generate, for the message manipulation requiring members (e.g., 120-*b*), one or more manipulated messages, being a manipulation of the original message, wherein the manipulated messages meet the available Quality of Service (block 324).

A respective manipulated message of the manipulated messages can be, but is not limited to, one of the following transformations of the original message: encoding, transcoding, down-sampling, video-to-voice, video-to-image, video-to-text, video-to-link, voice-to-text, voice-to-link, text-to-voice or text-to-link.

In some cases, a first member of the message manipulation requiring members can receive a first manipulated message, being the original message manipulated in a first manner, and a second member of the message manipulation requiring members can receive a second manipulated message, being the original message manipulated in a second manner, other than the first manner.

After generating the manipulated messages, collaboration management system 130 can be configured to communicate the manipulated messages to the message manipulation requiring members (e.g., 120-*b*) (block 328).

Attention is now drawn to FIG. 4, a flowchart illustrating a second example of a sequence of operations 400 performed by collaboration management system 130, in accordance with the presently disclosed subject matter.

In accordance with the presently disclosed subject matter, collaboration management system 130 can be configured, in some cases, to provide a predicted QoS availability map, the predicted QoS availability map being indicative of predicted available Quality of Services at a plurality of geographical locations within communications network 100 at one or more future times (block 404). The predicted available Quality of Service at a respective geographical location within communications network 100 at a respective future time can be determined utilizing at least one of the following predicted parameters: (a) a predicted available bandwidth that is to be made available by the communications network 100 to a respective network device, of the network devices, that would be located at the respective geographical location at the respective future time, (b) a predicted latency that is to be experienced over the communications network 100 by a respective network device, of the network devices, that would be located at the respective geographical location at the respective future time, (c) a predicted SNR of data that is to be transmitted over the communications network 100 to a respective network device, of the network devices, that would be located at the respective geographical location at the respective future time, or (d) a predicted reception level available for a respective network device, of the network devices in the communications network 100, that would located at the respective geographical location at the respective future time.

In some cases, at least one of the aforesaid parameters (i.e., available bandwidth, latency, SNR, or reception level) can be predicted using various known methods and/or techniques based on historical data of past changes in values of the at least one of the aforesaid parameters.

Moreover, collaboration management system 130 can be configured, in some cases, to provide predicted locations' information indicative of predicted geographical locations of at least some of the network devices (e.g., 110-*a*, 110-*b*, 110-*c*, 110-*d*, 110-*e*, 110-*f*) in communications network 100 (block 408). In some cases, the predicted locations' information can be determined based on historical data indicative of past geographical locations of the at least some of the network devices (e.g., 110-*a*, 110-*b*, 110-*c*, 110-*d*, 110-*e*, 110-*f*).

In some cases, collaboration management system 130 can be configured, e.g. using QoS availability prediction module 260, to predict a Quality of Service (QoS) availability level for at least one given network device of the network devices (e.g., network devices 110-*a*, 110-*b*, 110-*c*. 110-*d*, 110-*e*, and 110-*f*) in communications network 100 at one or more future times, the predicted Quality of Service availability level being indicative of a predicted available Quality of Service at a given predicted location of the predicted geographical locations associated with the given network device (e.g., network devices 110-*a*, 110-*b*, 110-*c*, 110-*d*, 110-*e*, or 110-*f*) at a respective future time, according to the predicted QoS availability map at the respective future time and the predicted locations' information at the respective future time (block 412).

Collaboration management system 130 can be configured to communicate an indication of the predicted Quality of Service availability level to at least one of the network devices (e.g., 110-*a*, 110-*b*, 110-*c*, 110-*d*, 110-*e*, 110-*f*) (block 416).

In some cases, collaboration management system 130 can be configured to cause display of the indication of the predicted Quality of Service availability level to at least one user of the at least one of the network devices (e.g., network devices 110-*a*, 110-*b*, 110-*c*, 110-*d*, 110-*e*, 110-*f*).

In some cases, the indication is displayed on a user interface of the given network device (e.g., network device 110-*a*, 110-*b*, 110-*c*, 110-*d*, 110-*e*, or 110-*f*).

Additionally, or alternatively, in some cases, the indication is displayed on a user interface of one or more second network devices of the network devices (e.g., network devices 110-*a*, 110-*b*, 110-*c*, 110-*d*, 110-*e*, 110-*f*) in communications network 100, other than the given network device. In some cases, the respective second network device is associated with a dispatcher that is in charge of one or more task force collaboration groups (e.g., 120-*a*, 120-*b*, 120-*c*). Such dispatcher can transmit messages to network devices (e.g., network devices 110-*a*, 110-*b*, 110-*c*, 110-*d*, 110-*e*, or 110-*f*) that are members of various task force collaboration groups (e.g., 120-*a*, 120-*b*, 120-*c*).

In some cases, the second network devices can he identified using groups' information indicative of one or more collaboration groups (e.g., 120-*a*, 120-*b*, 120-*c*), as defined earlier herein, so that the second network devices and the given network device are members of one or more common collaboration groups (e.g., 120-*c*).

In some cases, collaboration management system 130 can be configured, e.g. using message manipulation module 240, to identify at least one network device (e.g., 110-*a*, 110-*b*, 110-*c*, 110-*d*, 110-*e*, 110-*f*) that will be a message manipulation requiring member at a future time, resulting from an available Quality of Service for the message manipulation requiring member at the future time, based on the predicted locations' information at the future time and the predicted QoS availability map at the future time, that does not support a Quality of Service requirement of a type of message (e.g., voice recording, etc.) that is to be transmitted to the message manipulation requiring member at the future time (e.g., it is known that part of the transmission of the message (e.g., voice recording) is to occur at the future time).

Attention is now drawn to FIG. 5, is a flowchart illustrating an example of a sequence of operations 500 performed by collaboration management system 130 for network devices capabilities management, in accordance with the presently disclosed subject matter.

In accordance with the presently disclosed subject matter, collaboration management system 130 can be configured, in some cases, to provide a network devices capabilities information, the network devices capabilities information being indicative of capabilities of each of the network devices (e.g., 110-*a*, 110-*b*, 110-*c*, 110-*d*, 110-*e*, 110-*f*); and, in some cases, to provide groups' information indicative of the collaboration groups (e.g., 120-*a*, 120-*b*, 120-*c*), wherein each collaboration group of the collaboration groups (e.g., 120-*a*, 120-*b*, 120-*c*) indicates at least two of the network devices being members in the respective collaboration group (e.g., the members in collaboration group 120-*a* are network devices 110-*a*, 110-*b* and 110-*c*) (block 510).

In some cases, the network devices (e.g., 110-*a*, 110-*b*, 110-*c*, 110-*d*, 110-*e*, 110-*f*) include at least one user device (e.g., a smartphone, a tablet, a laptop, etc.). in some cases, the network devices include at least one Internet of Things (IoT) device (e.g., a smart camera, a smart gate, etc.). In some cases, the network devices include at least one user device and at least one IoT device. It is to be noted that in some cases the at least one user device and at least one IoT device are members of a given collaboration group of the collaboration groups (e.g., 120-*a*, 120-*b*, 120-*c*).

In some cases, collaboration management system 130 can be configured to update the network devices capabilities information based on the current capabilities, e.g. using current network devices capabilities information received from at least some of the network devices.

In some cases, collaboration management system 130 can be configured to update the network devices capabilities information by continuously performing the following: receiving, from at least some of the network devices (e.g., 110-*a*, 110-*b*, 110-*c*, 110-*d*, 110-*e*, 110-*f*), network devices capabilities information indicative of current capabilities of the respective network device (e.g., 110-*a*, 110-*b*, 110-*c*, 110-*d*, 110-*e*, or 110-*f*); and updating the network devices capabilities information based on the current capabilities of the respective network device (e.g., 110-*a*, 110-*b*, 110-*c*, 110-*d*, 110-*e*, or 110-*f*).

In some cases, collaboration management system 130 can be configured to generate and communicate manipulated messages, e.g. using message manipulation module 240, based on the network devices capabilities information and the groups' information.

Specifically, collaboration management system 130 can be configured to obtain, from a given member (e.g., network device 110-*a*) of a given collaboration group (e.g., 120-*a*) of the collaboration groups (e.g., 120-*a*, 120-*b*, 120-*c*), an original message to be transmitted to other members (e.g., 110-*b*, 110-*c*) of the given collaboration group (e.g., 120-*a*), other than the given member (e.g., 110-*a*), the message having a capabilities requirement (block 520).

Collaboration management system 130 can be further configured to identify at least one message manipulation requiring member (e.g., 110-*b*) of the other members (e.g., 110*b* and 110*c*). if any, the message manipulation requiring member (e.g., 110-*b*), is associated with a given network device having, according to the network devices capabilities information, respective capabilities that do not support the capabilities requirement (block 530).

Moreover, collaboration management system 130 can be configured to generate, for the message manipulation requiring members (e.g., 120-*b*), at least one manipulated message, being a manipulation of the original message, wherein the manipulated message meets the respective capabilities of the given network device (block 540).

A respective manipulated message of the manipulated messages can be, but is not limited to, one of the following transformations of the original message: encoding, transcoding, down-sampling, video-to-voice, video-to-image, video-to-text, video-to-link, voice-to-text, voice-to-link, text-to-voice, or text-to-link.

In some cases, a first member of the message manipulation requiring members can receive a first manipulated message, being the original message manipulated in a first manner, and a second member of the message manipulation requiring members can receive a second manipulated message, being the original message manipulated in a second manner, other than the first manner.

After generating the manipulated messages, collaboration management system 130 can be configured to communicate the manipulated messages to the message manipulation requiring members (e.g., 120-*b*) (block 550).

Moreover, in some cases, collaboration management system 130 can be further configured to provide a dynamic Quality of Service availability map, the dynamic Quality of Service availability map being indicative of current available Quality of Services at a plurality of geographical locations within the communications network 100 and to provide current locations' information indicative of current geographical locations of at least some of the network devices (e.g., 110-*a*, 110-*b*, 110-*c*, 110-*d*, 110-*e*, 110-*f*). In these cases, the message has also a QoS requirement.

In some cases, the current locations' information for at least one of the network devices (e.g., 110-*a*, 110-*b*, 110-*c*, 110-*d*, 110-*e*, 110-*f*) can be a logical location of the at least one of the network devices (e.g., inside a given truck) that translates into a given geographical location of the at least one of the network devices.

The collaboration management system 130 can be configured to also identify the at least one message manipulation requiring member that is currently located, according to the current locations' information, at a respective geographical location having, according to the dynamic Quality of Service availability map, an available Quality of Service that does not support the Quality of Service requirement and the manipulated message also meets the available QoS.

In some cases, collaboration management system 130 can identify message manipulation requiring members based on both the capabilities and the available QoS of the corresponding message manipulation requiring members. A non-limiting example can be of a text message to be sent to a given network device (e.g., 110-*a*, 110-*b*, 110-*c*, 110-*d*, 110-*e*, 110-*f*). The given network device lacks a screen and has a given bandwidth available. The message is thus manipulated to a voice message utilizing a text-to-voice manipulation in order to stand by the respective capabilities requirement. The voice message is downgraded in order to meet the available QoS of the given network device. The downgraded voice message is sent to the given network device. Another non-limiting example can be of a text message in a first locale (for example: a text message in the Chinese language) that is to be sent to a given network device (e.g., 110-*a*, 110-*b*, 110-*c*, 110-*d*, 110-*e*, 110-*f*) that requires a locale of the English language. The message is thus manipulated utilizing a textual translation manipulation to a corresponding English language textual message in order to stand by the respective capabilities requirement.

It is to be noted that, with reference to FIGS. 3-5, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for management of task force collaboration over a communications network comprising a plurality of network devices, the system comprising processing circuitry configured to:

provide:
  (a) network devices capabilities information, the network devices capabilities information being indicative of capabilities of each given network device of the network devices, wherein the capabilities are determined utilizing at least one of the following parameters: (i) hardware components of the given network device, wherein the hardware components are one or more of: (1) a screen, (2) a camera, (3) a Global Positioning System (GPS), (4) a speaker, or (5) a keyboard, (ii) software components installed on the given network device, or (iii) a locale of the given network device; and
  (b) groups' information indicative of one or more task force collaboration groups, wherein each task force collaboration group of the task force collaboration groups indicates at least two of the network devices being members in the respective task force collaboration group;

obtain, from a given member of a given task force collaboration group of the task force collaboration groups, a message to be transmitted to other members of the given task force collaboration group, other than the given member, the message having a capabilities requirement, defining at least one of: (a) a minimal required set of required hardware components of a receiving network device of the other members, wherein the required hardware components are one or more of: (1) a screen, (2) a camera, (3) a GPS, (4) a speaker, or (5) a keyboard, (b) a minimal required set of required software components of the receiving network device, or (c) locale requirements from the receiving network device;

identify at least one message manipulation requiring member of the other members, that is associated with a given network device having, according to the network devices capabilities information, respective capabilities that do not support the capabilities requirement;

generate, for the message manipulation requiring member, a manipulated message, being a manipulation of the message, wherein the manipulated message meets the respective capabilities of the given network device; and communicate the manipulated message to the message manipulation requiring member.

2. The system of claim 1, wherein:
(a) the processing circuitry is further configured to provide also: (i) a dynamic Quality of Service availability map, the dynamic Quality of Service availability map being indicative of current available Quality of Services at a plurality of geographical locations within the communications network; and (ii) current locations' information indicative of current geographical locations of at least some of the network devices;

(b) the message having a Quality of Service requirement;

(c) the at least one message manipulation requiring member is currently located, according to the current locations' information, at a respective first geographical location having, according to the dynamic Quality of Service availability map, an available Quality of Service that does not support the Quality of Service requirement; and (d) the manipulated message also meets the available Quality of Service.

3. The system of claim 1, wherein the manipulated message is one of the following transformations of the message: encoding, transcoding, down-sampling, video-to-voice, video-to-image, video-to-text, video-to-link, voice-to-text, voice-to-link, or text-to-link.

4. The system of claim 1, wherein the network devices include at least one user device.

5. The system of claim 1, wherein the network devices include at least one Internet of Things (IoT) device.

6. The system of claim 1, wherein the network devices include at least one user device and at least one IoT device.

7. The system of claim 1, wherein the processing circuitry is further configured to continuously perform the following:

receive, from at least some of the network devices, current network devices capabilities information indicative of current capabilities of the respective network device; and update the network devices capabilities information based on the current capabilities.

8. The system of claim 1, wherein a first member of the other members receives a first manipulated message, being the message manipulated in a first manner, and a second member of the other members receives a second manipulated message, being the message manipulated in a second manner, other than the first manner.

9. A method for management of task force collaboration over a communications network comprising a plurality of network devices, the method comprising:

providing, by a processing circuitry:

(a) network devices capabilities information, the network devices capabilities information being indicative of capabilities of each given network device of the network devices, wherein the capabilities are determined utilizing at least one of the following parameters: (i) hardware components of the given network device, wherein the hardware components are one or more of: (1) a screen, (2) a camera, (3) a Global Positioning System (GPS), (4) a speaker, or (5) a keyboard, (ii) software components installed on the given network device, or (iii) a locale of the given network device; and (b) groups' information indicative of one or more task force collaboration groups, wherein each task force collaboration group of the task force collaboration groups indicates at least two of the network devices being members in the respective task force collaboration group;

obtaining, by the processing circuitry, from a given member of a given task force collaboration group of the task force collaboration groups, a message to be transmitted to other members of the given task force collaboration group, other than the given member, the message having a capabilities requirement, defining at least one of: (a) a minimal required set of required hardware components of a receiving network device of the other members, wherein the required hardware components are one or more of: (1) a screen, (2) a camera, (3) a GPS, (4) a speaker, or (5) a keyboard, (b) a minimal required set of required software components of the receiving network device, or (c) locale requirements from the receiving network device;

identifying, by the processing circuitry, at least one message manipulation requiring member of the other members, that is associated with a given network device having, according to the network devices capabilities information, respective capabilities that do not support the capabilities requirement;

generating, by the processing circuitry, for the message manipulation requiring member, a manipulated message, being a manipulation of the message, wherein the manipulated message meets the respective capabilities of the given network device; and communicating, by the processing circuitry, the manipulated message to the message manipulation requiring member.

10. The method of claim 9, wherein:

(a) the method further comprising: providing also, by the processing circuitry: (i) a dynamic Quality of Service availability map, the dynamic Quality of Service availability map being indicative of current available Quality of Services at a plurality of geographical locations within the communications network; and (ii) current locations' information indicative of current geographical locations of at least some of the network devices;

(b) the message having a Quality of Service requirement;

(c) the at least one message manipulation requiring member is currently located, according to the current locations' information, at a respective first geographical location having, according to the dynamic Quality of Service availability map, an available Quality of Service that does not support the Quality of Service requirement; and (d) the manipulated message also meets the available Quality of Service.

11. The method of claim 9, wherein the manipulated message is one of the following transformations of the message: encoding, transcoding, down-sampling, video-to-voice, video-to-image, video-to-text, video-to-link, voice-to-text, voice-to-link, or text-to-link.

12. The method of claim 9, wherein the network devices include at least one user device.

13. The method of claim 9, wherein the network devices include at least one Internet of Things (IoT) device.

14. The method of claim 9, wherein the network devices include at least one user device and at least one IoT device.

15. The method of claim 9, further comprising:

receiving, by the processing circuitry, from at least some of the network devices, current network devices capabilities information indicative of current capabilities of the respective network device; and updating, by the processing circuitry, the network devices capabilities information based on the current capabilities.

16. The method of claim 9, wherein a first member of the other members receives a first manipulated message, being the message manipulated in a first manner, and a second member of the other members receives a second manipulated message, being the message manipulated in a second manner, other than the first manner.

17. A non-transitory computer readable storage medium having computer readable program code embodied therewith, the computer readable program code, executable by at least one processing circuitry of a computer to perform a method for management of task force collaboration over a communications network comprising a plurality of network devices, the method comprising:

provi­ding, by a processing circuitry:

(a) network devices capabilities information, the network devices capabilities information being indicative of capabilities of each given network device of the network devices, wherein the capabilities are determined utilizing at least one of the following parameters: (i) hardware components of the given network device, wherein the hardware components are one or more of: (1) a screen, (2) a camera, (3) a Global Positioning System (GPS), (4) a speaker, or (5) a keyboard, (ii) software components installed on the given network device, or (iii) a locale of the given network device; and (b) groups' information indicative of one or more task force collaboration groups, wherein each task force collaboration group of the task force collaboration groups indicates at least two of the network devices being members in the respective task force collaboration group;

obtaining, by the processing circuitry, from a given member of a given task force collaboration group of the task force collaboration groups, a message to be transmitted to other members of the given task force collaboration group, other than the given member, the message having a capabilities requirement, defining at least one of: (a) a minimal required set of required hardware components of a receiving network device of the other members, wherein the required hardware components are one or more of: (1) a screen, (2) a camera, (3) a GPS, (4) a speaker, or (5) a keyboard, (b) a minimal required set of required software components of the receiving network device, or (c) locale requirements from the receiving network device;

identifying, by the processing circuitry, at least one message manipulation requiring member of the other members, that is associated with a given network device having, according to the network devices capabilities information, respective capabilities that do not support the capabilities requirement;

generating, by the processing circuitry, for the message manipulation requiring member, a manipulated message, being a manipulation of the message, wherein the manipulated message meets the respective capabilities of the given network device; and communicating, by the processing circuitry, the manipulated message to the message manipulation requiring member.

\* \* \* \* \*